US009362780B2

United States Patent
Zhang et al.

(10) Patent No.: US 9,362,780 B2
(45) Date of Patent: Jun. 7, 2016

(54) PIEZOELECTRIC CHARGING SYSTEM AND ELECTRONIC DEVICE USING SAME

(71) Applicants: Lihong Zhang, Shenzhen (CN); Xiaofang Shu, Shenzhen (CN)

(72) Inventors: Lihong Zhang, Shenzhen (CN); Xiaofang Shu, Shenzhen (CN)

(73) Assignees: AAC Acoustic Technologies (Shenzhen) Co., Ltd., Shenzhen (CN); AAC Technologies (Nanjing) Co., Ltd., Nanjing (CN); AAC Microtech (Changzhou) Co., Ltd., Changzhou (CN)

( * ) Notice: Subject to any disclaimer, the term of this patent is extended or adjusted under 35 U.S.C. 154(b) by 189 days.

(21) Appl. No.: 14/162,942

(22) Filed: Jan. 24, 2014

(65) Prior Publication Data
US 2014/0285149 A1 Sep. 25, 2014

(30) Foreign Application Priority Data

Mar. 20, 2013 (CN) .......................... 2013 1 0091583

(51) Int. Cl.
*H02J 7/00* (2006.01)
*H02J 7/32* (2006.01)
(52) U.S. Cl.
CPC ... *H02J 7/32* (2013.01); *Y02B 40/90* (2013.01)

(58) Field of Classification Search
CPC .... B41J 2002/022; A61N 2/02; A01M 1/205; A01M 29/12; H02J 7/32
USPC ................................................... 320/110–116
See application file for complete search history.

(56) References Cited

U.S. PATENT DOCUMENTS

| 2007/0188048 A1* | 8/2007 | Nagahama | H01L 41/0906 310/316.01 |
|---|---|---|---|
| 2008/0212262 A1* | 9/2008 | Micallef | H01G 9/155 361/502 |
| 2008/0278033 A1* | 11/2008 | Adachi | H01L 41/083 310/317 |
| 2009/0095821 A1* | 4/2009 | Feriani | H01L 41/042 239/74 |

* cited by examiner

*Primary Examiner* — Binh Tat
(74) *Attorney, Agent, or Firm* — IPro, PLLC; Na Xu

(57) ABSTRACT

The present disclosure relates to a piezoelectric charging system, which has two operational modes: a vibration mode and a charging mode. The system includes a piezoelectric vibrator, a driving module, a switch selecting module, a rectifying and processing module and a charging control module. The present disclosure can make full use of the mechanical energy from human beings and the ambient environment to provide the electronic device with an important energy source. Furthermore, energy can be charged to the electronic devices in real time. Furthermore, the present disclosure provides a terminal device using the piezoelectric charging system.

7 Claims, 4 Drawing Sheets

US 9,362,780 B2

PIEZOELECTRIC CHARGING SYSTEM AND ELECTRONIC DEVICE USING SAME

FIELD OF THE INVENTION

The present disclosure generally relates to a piezoelectric charging system using Piezoelectricity Effect, and also to an electronic device equipped with the charging system.

DESCRIPTION OF RELATED ART

With widespread use of electronic terminal devices such as smart phones, the mobile phones are now used not merely as a tool of voice communication, but more of a kind of entertainment devices. However, the more applications and the higher speed of the mobile phones necessitate consumption of more electric energy, so batteries of the mobile phones have become a bottleneck for the mobile phones, and how to prolong the service duration of the mobile phone batteries or how to recharge the batteries conveniently in real time have become a hot topic of research in the art. The present disclosure is indeed a system for charging the battery in real time for satisfying this need.

Chargers are a kind of devices for converting an alternating current (AC) into a low-voltage direct current (DC). Chargers are widely used in various sectors, and particularly in the daily life, are widely used in common electronic devices such as mobile phones, cameras and tablet computers that rely on batteries to store energy for portability. Especially, the chargers are used very widely in mobile phones. A conventional charger is a kind of stationary converting device that uses power electronic semiconductor devices to convert the utility AC power having a constant voltage level and a constant frequency into a DC current. Although the power consumption of the charger is relatively low, taking the utility power as a power supply for a long period of time still represents a high expenditure.

It is well known that, the piezoelectricity exists everywhere, and the pressure is also a kind of energy source. If a pressure is applied to a piezoelectric material, an electric potential difference will be generated (i.e., the piezoelectricity effect); and conversely, if a voltage is applied, a mechanical stress will be generated (i.e., the conversed piezoelectricity effect). If such energy that is ignored unconsciously can be collected and converted into electric energy for use, it will be beneficial to the society that suffers from a shortage of energy resources.

The present disclosure provides a system that converts the human beings' mechanical kinetic energy into electric energy by use of the existing piezoelectric vibrators in mobile phones with an additional functional module.

DETAILED DESCRIPTION OF EXEMPLARY EMBODIMENT

Hereinbelow, the present disclosure will be further described with reference to the attached drawings and an exemplary embodiment thereof.

Figure 1:
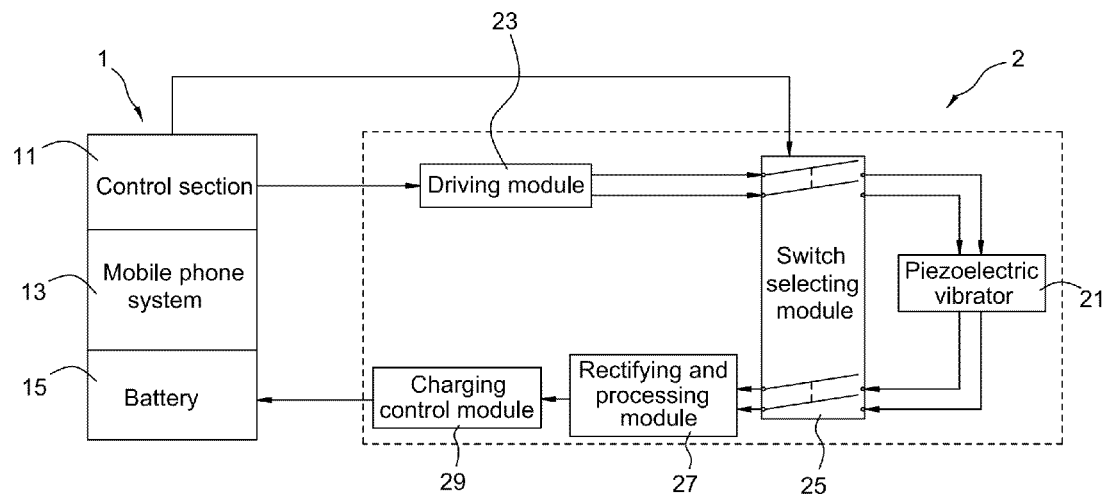
FIG. 1 is a schematic block diagram illustrating a piezoelectric charging system according to an embodiment of the present invention.

Referring to FIG. 1, there is shown a block diagram of a piezoelectric charging system in accordance with an exemplary embodiment of the present disclosure. The piezoelectric charging system has two operational modes: a vibration mode and a charging mode. An exemplary embodiment in which a piezoelectric charging system 2 is applied to a mobile phone terminal device 1 is described hereinafter. However, this embodiment is only intended to illustrate the specific application of the present disclosure so that the technical solution and principle of the present disclosure can be clearly understood by those of ordinary skill in the art, but is not to limit the scope of the present disclosure.

In this embodiment, when the piezoelectric charging system 2 is applied to the mobile phone terminal device 1, the cooperation between the piezoelectric charging system 2 and the terminal device 1 is described in detail as follows.

The mobile phone terminal device 1 comprises a control section 11, a mobile phone system 13 and battery 15. The battery 15 supplies electric energy to the control section 11 and the mobile phone system 13 to ensure normal operation thereof. The piezoelectric charging system 2 is electrically connected with the control section 11 and the battery 15. The piezoelectric charging system 2 is used as a supplemental charging means for the mobile phone terminal device 1 to prolong the service duration of the mobile phone terminal device 1.

The piezoelectric charging system 2 comprises a piezoelectric vibrator 21, a driving module 23, a switch selecting module 25, a rectifying and processing module 27 and a charging control module 29.

By virtue of predetermined connection or configuration, the piezoelectric charging system 2 may also be provided with a vibration mode and a charging mode, which is determined by which of piezoelectricity effect and conversed piezoelectricity effect is used. Conversed piezoelectricity effect is used for vibration mode, and piezoelectricity effect is used for charging mode.

When the piezoelectric charging system 2 is in the vibration mode, the control section 11 outputs a vibration signal. The vibration signal is amplified by the driving module 23 and is then transmitted, via a vibration pathway selected by the switch selecting module 25, to the piezoelectric vibrator 21 so that vibration is generated by the piezoelectric vibrator 21 as a feedback to the user. This mode is only used for providing vibration as ringtone reminder, screen tactile feedback and so on.

When the piezoelectric power generation charging system 2 is in the charging mode, the control section 11 generates a control signal to adjust an operational mode switch of the switch selecting module 25 to select a charging pathway. Electric charges generated through vibration of the piezoelectric vibrator 21 are input into the rectifying and processing module 27 via the charging pathway, and then the rectified signal is fed back into the battery 15 by the charging control module 29 to replenish the electric energy.

The piezoelectric vibrator 21 of the piezoelectric charging system 2 comprises a piezoelectric sheet as an important component for energy conversion. The piezoelectric sheet is used to convert the electric energy into the mechanical energy in the vibration mode and convert the mechanical energy into the electric energy in the charging mode.

Figure 2:
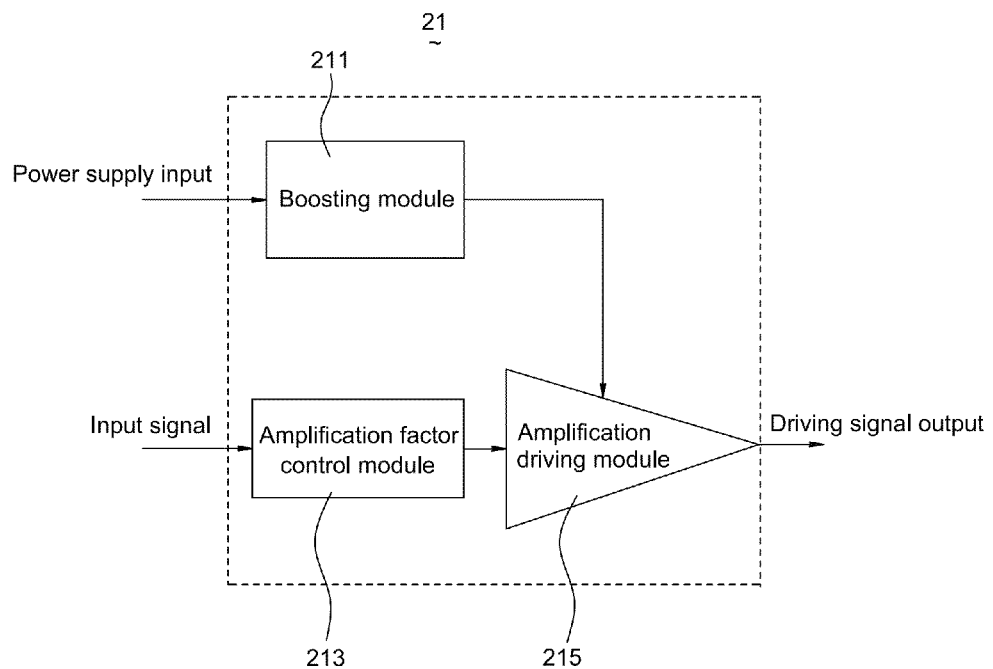
FIG. 2 is a schematic block diagram of a driving module of the piezoelectric charging system shown in FIG. 1.

The driving module 23 is adapted to drive the piezoelectric vibrator 21 to vibrate in the vibration mode. The piezoelectric sheet in the piezoelectric vibrator 21 requires a high piezoelectric field in the vibration mode, e.g., the power supply of the battery 15 is generally 3.7V. A schematic view of an exemplary driving module of the piezoelectric vibrator 21 of the present disclosure is shown in FIG. 2. As shown, the piezoelectric vibrator 21 mainly comprises a boosting module 211, an amplification factor control module 213 and an amplification driving module 215. The boosting module 211 is adapted to boost the supply voltage of the battery 15 to a driving voltage necessary for the piezoelectric sheet of the piezoelectric vibrator 21 to vibrate. The amplification factor control module 213 is mainly adapted to adjust amplitude of an input signal that is input into the piezoelectric vibrator 21. The amplification driving module 215 is adapted to amplify the input signal of which the amplitude has been controlled so that the voltage and power required for driving the piezoelectric vibrator 21 to vibrate can be achieved. The input signal in the driving module 23 may be of an analog signal or a digital signal.

Figure 3:
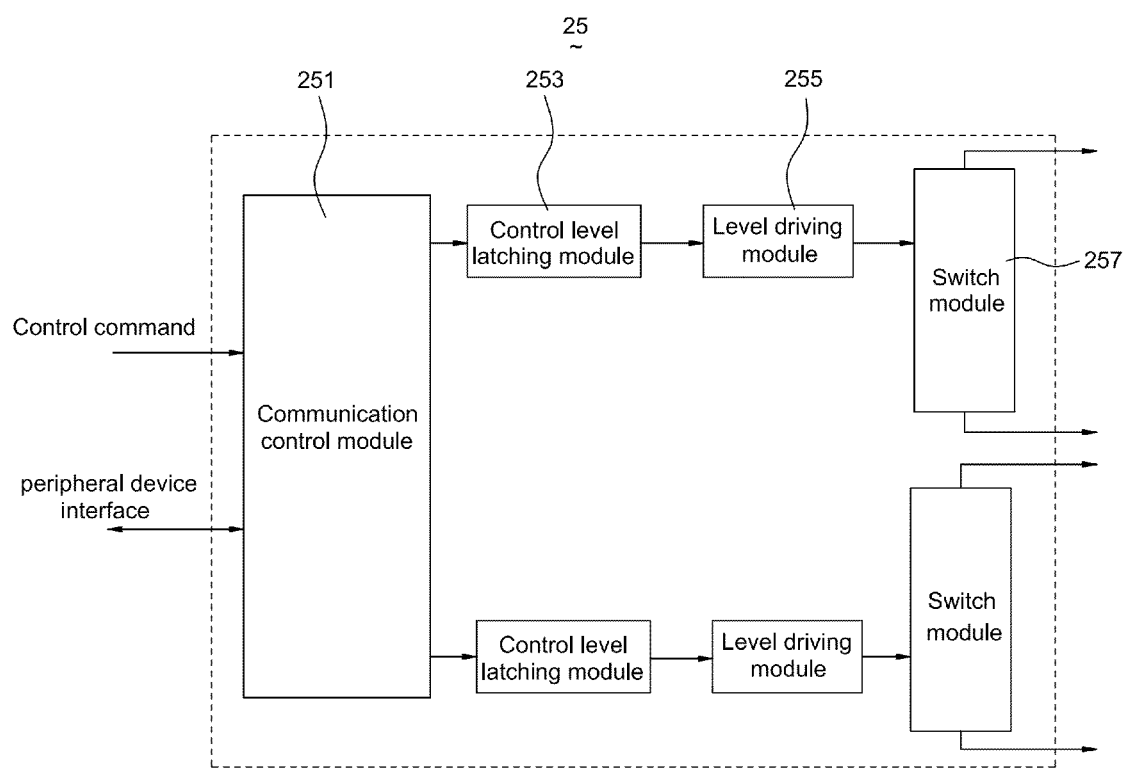
FIG. 3 is a schematic block diagram of a switch selecting module of the piezoelectric charging system shown in FIG. 1.

The switch selecting module 25 is adapted to control whether the vibration mode or the charging mode is selected by the piezoelectric charging system 2. A schematic block diagram of a typical switch selecting module according to the exemplary embodiment of the present disclosure is shown in FIG. 3. The switch selecting module 25 comprises a communication control module 251, a control level latching module 253, a level driving module 255 and a switch module 257. The communication control module 251 is adapted to receive a control signal from the control section 11 of the mobile phone 1 and convert the control signal into a switch control signal. The control level latching module 253 is adapted to latch the switch control signal of the communication control module 251 and hold the switch control signal so that the communication control module 251 need not be triggered continuously. The level driving module 255 is adapted to convert the switch control signal into a level signal necessary for driving the switch module 257. The switch module 257 is adapted to turn on or off signals according to the control signal.

Figure 4:
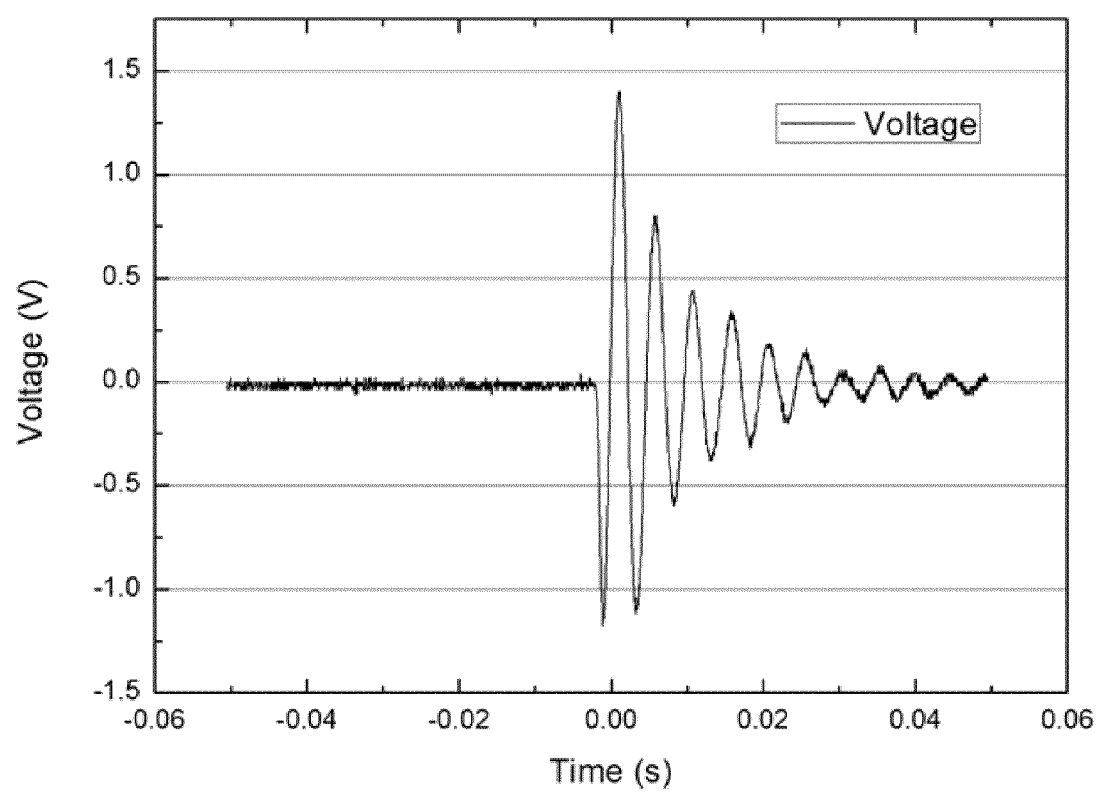
FIG. 4 is a typical waveform diagram produced by mechanical vibration.
Figure 5:
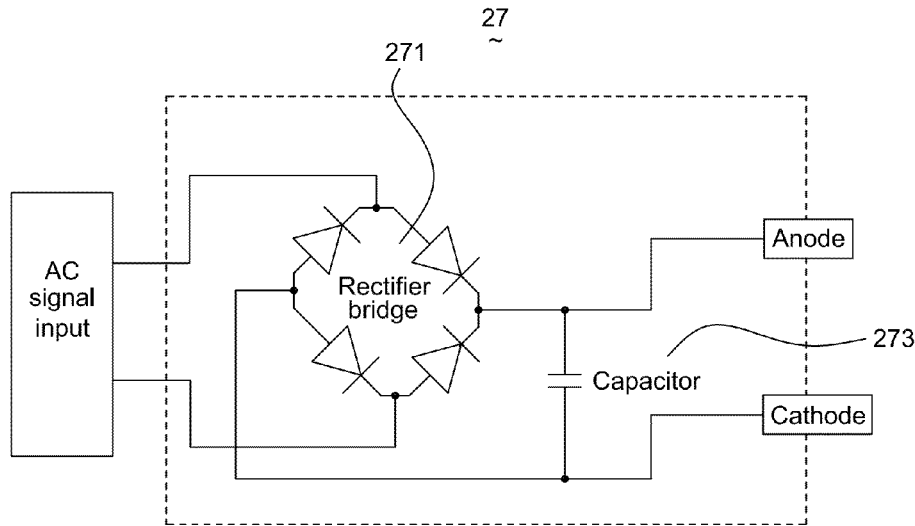
FIG. 5 is a schematic block diagram of a rectifying and processing module of the piezoelectric charging system shown in FIG. 1.

The rectifying and processing module 27 is adapted to rectify and filter the electric signal output from the piezoelectric vibrator 21 in the charging mode. As shown in FIG. 4, a waveform of a typical electric signal obtained through conversion from a mechanical vibration is an AC signal. However, the output of the mobile phone battery 15 is a DC signal, so the electric signal output from the piezoelectric vibrator 21 must be rectified and filtered. In this embodiment, a typical schematic block diagram of the rectifying and processing module 27 is as shown in FIG. 5. The rectifying and processing module 27 comprises a rectifier bridge 271 and a capacitor 273. The rectifier bridge 271 is used to convert the AC signal into a DC signal, and the capacitor 273 is used for filtering and for temporary storage of energy.

Figure 6:
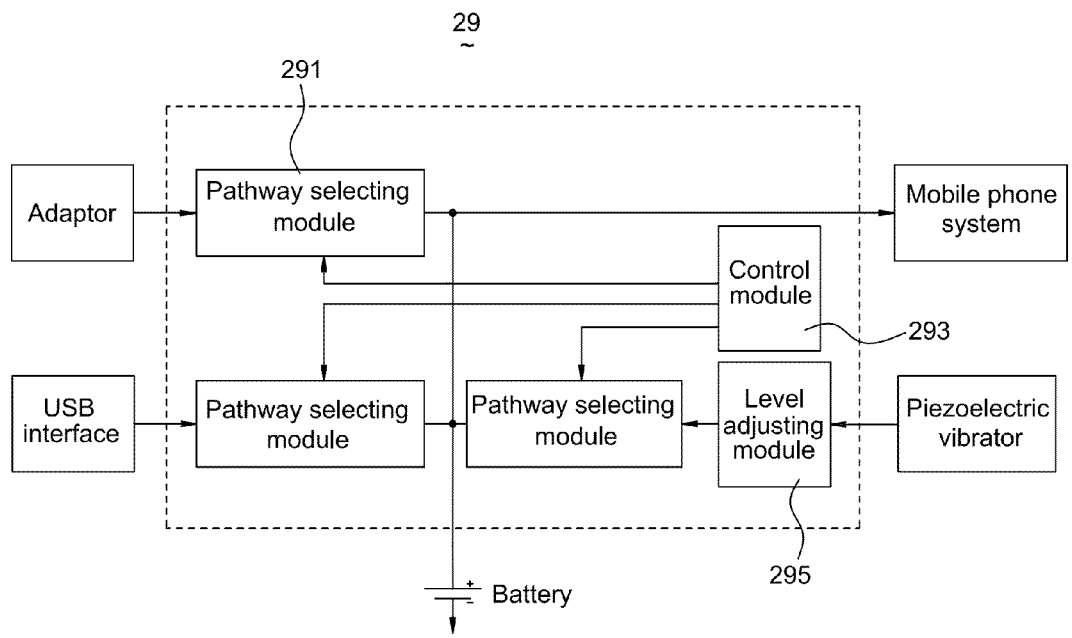
FIG. 6 is a block diagram of a charging control module of the piezoelectric charging system shown in FIG. 1.

The charging control module 29 is adapted to select a charging manner, select an ON or OFF status of the pathway and adjust the voltage generated by the piezoelectric vibrator 21. The charging manners of the mobile phone terminal device 1 generally include the adaptor manner and the USB manner. The present disclosure further provides a third charging manner. A block diagram of a typical charging control module of the present disclosure is shown in FIG. 6. The charging control module 29 comprises a pathway selecting module 291, a control module 293 and a level adjusting module 295. The pathway selecting module 291 is adapted to select an ON or OFF status of the pathway. The control module 293 is adapted to control the charging manner. The level adjusting module 295 is adapted to adjust a voltage generated by the piezoelectric vibrator 21 so that the charging voltage is kept within a certain range to satisfy the optimal charging voltage of the mobile phone battery.

The exemplary embodiment describes a mobile phone terminal device using the piezoelectric charging system. Indeed, any electronic device desired for enhanced battery endurance may use such a piezoelectric charging system set forth above.

A process of using the piezoelectric charging system 2 to charge the electronic device 1 comprises the following steps:

firstly, the electronic device 1 generates a control signal to adjust an operational mode switch of the switch selecting module 25 so that a charging pathway is selected and an operational mode of the piezoelectric power generation charging system is controlled to be a charging mode;

then, the driving module 23 drives the piezoelectric vibrator 21 to vibrate in the vibration mode so that the vibrating mechanical energy is converted by the piezoelectric vibrator 21 into the electric energy;

further, electric charges generated by vibration of the piezoelectric vibrator 21 is input into the rectifying and processing module 27 through the charging pathway; and finally, the charging control module 29 transmits the signal rectified by the rectifying and processing module 27 to the electronic terminal device to charge the electronic device.

A process of using the piezoelectric power generation charging system 2 for the vibration mode of the electronic device 1 comprises the following steps:

firstly, the electronic device 1 generates a control signal to adjust the operational mode switch of the switch selecting module 25 into a vibration mode;

then, a vibration signal is output by the electronic device 1, and the vibration signal is amplified by the driving module 23 of the piezoelectric power generation charging system 2 and transmitted via the vibration pathway selected by the switch selecting module 25 to the piezoelectric vibrator 21 to generate vibration; and the vibration is provided to the user as a feedback for use as a ringtone reminder, a screen tactile feedback and so on.

In the aforesaid embodiment, a mobile phone is described as an example of the electronic device. However, as a further improvement on the aforesaid embodiment, the electronic device may also be some other smart terminal, and any electronic terminal that uses the piezoelectric charging system 2 as an additional energy supplying system of the electronic terminal device to prolong the service duration of the electronic device shall all fall within the scope of the present disclosure. Of course, the piezoelectric charging system 2 may also be switched to the vibration mode to provide a vibration feedback to the electronic device, thereby improving the utility of the electronic device.

The present disclosure makes full use of the mechanical energy from the human being and the ambient environment to provide the electronic device with an important energy source. Furthermore, energy can be charged to batteries of the electronic terminal device in real time. As the batteries have currently become a bottleneck for electronic devices such as mobile phone, this is a very useful means to replenish the electric energy, and even in some outdoor special or severe environments, this can provide an important emergency electric power source for mobile phones. The present disclosure can not only combine the vibration mode and the charging mode together, but also save the production cost of components.

On the other hand, the piezoelectric charging system 2 makes full use of the piezoelectric effect and conversed piezoelectricity effect of the piezoelectric material so that a plurality of functions can be achieved by one component (i.e., the piezoelectric vibrator). This greatly saves the cost and does not need to change the system of the electronic terminal devices (e.g., mobile phones) significantly, so it is easy to be achieved.

What described above are only preferred embodiments of the present disclosure, and the scope of the present disclosure is not limited to what described above. Rather, any equivalent modifications or changes made by those of ordinary skill in the art according to the contents of the present disclosure shall all fall within the scope of the present disclosure.

What is claimed is:

1. A piezoelectric charging system, having two operational modes including a vibration mode and a charging mode, the system comprising:
    a piezoelectric vibrator for converting the electric energy into the mechanical energy in the vibration mode and converting the mechanical energy into the electric energy in the charging mode;
    a driving module for driving the piezoelectric vibrator to vibrate in the vibration mode;
    a switch selecting module for controlling the piezoelectric charging system to select whether the vibration mode or the charging mode is used, wherein the switch selecting module further comprises a communication control module for receiving a control signal and convert the control signal into a switch control signal, a control level latching module for latching the switch control signal of the communication control module and hold the switch control signal so that the communication control module need not be triggered continuously, a level driving module for converting the switch control signal into a level signal necessary for driving the switch module, and a switch module for turning on or off signals according to the control signal;
    a rectifying and processing module for rectifying and filtering an electric signal output from the piezoelectric vibrator in the charging mode; and
    a charging control module for selecting a charging manner, selecting an ON or OFF status of a pathway and adjusting a voltage generated by the piezoelectric vibrator.

2. The piezoelectric charging system of claim 1, wherein the driving module comprises a boosting module, an amplification factor control module and an amplification driving module, the boosting module is adapted for boosting a power supply voltage to a voltage necessary for enabling the piezoelectric vibrator to vibrate, the amplification factor control module is adapted for adjusting an amplitude of an input signal that is input into the piezoelectric vibrator, and the amplification driving module is adapted for amplifying the input signal of which the amplitude has been controlled so that the voltage and power required for driving the piezoelectric vibrator to vibrate can be achieved.

3. The piezoelectric charging system of claim 2, wherein the input signal is of an analog signal or a digital signal.

4. The piezoelectric charging system of claim 1, wherein the rectifying and processing module comprises a rectifier bridge for converting an alternating current (AC) signal generated by the piezoelectric vibrator into a direct current (DC) signal, and a capacitor for filtering and for temporary storage of energy.

5. The piezoelectric charging system of claim 1, wherein the charging control module comprises a pathway selecting module for selecting an ON or OFF status of the pathway, a control module for controlling the charging manner, and a level adjusting module for adjusting a voltage generated by the piezoelectric vibrator so that the charging voltage is kept within a certain range.

6. An electronic terminal device, comprising the piezoelectric charging system in claim 1.

7. An electronic device, comprising:
    a battery;
    a piezoelectric charging system configured for being capable of charging the battery, the piezoelectric charging system comprising:
    a piezoelectric vibrator including a piezoelectric sheet for sensing the vibration of the electronic device and converting the vibration into electric energy by virtue of the deformation of the piezoelectric sheet;
    a driving module for driving the piezoelectric vibrator to vibrate in the vibration mode, a switch selecting module for controlling the piezoelectric charging system to select whether the vibration mode or the charging mode is used, a rectifying and processing module for rectifying and filtering an electric signal output from the piezoelectric vibrator in the charging mode, and a charging control module for selecting a charging manner, selecting an ON or OFF status of a pathway and adjusting a voltage generated by the piezoelectric vibrator.

* * * * *